(12) United States Patent
Giefer et al.

(10) Patent No.: US 8,544,358 B1
(45) Date of Patent: Oct. 1, 2013

(54) ACTUATING DEVICE COMPRISING A LOCKING MECHANISM

(71) Applicant: ZF Friedrichshafen AG, Friedrichshafen (DE)

(72) Inventors: Andreas Giefer, Lemforde (DE); Ludger Rake, Diepholz (DE); Sascha Rosentreter, Espelkamp (DE); Daniel Heitmann, Dinklage (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/895,494

(22) Filed: May 16, 2013

Related U.S. Application Data

(62) Division of application No. 12/599,052, filed as application No. PCT/DE2008/050013 on May 7, 2008, now Pat. No. 8,464,601.

(30) Foreign Application Priority Data

May 22, 2007 (DE) .......................... 10 2007 024 030

(51) Int. Cl.
*G05G 5/00* (2006.01)

(52) U.S. Cl.
USPC ..................................... 74/473.25; 74/473.12

(58) Field of Classification Search
USPC ................. 74/473.1, 473.12, 473.21–473.25, 74/473.3
See application file for complete search history.

(56) References Cited

U.S. PATENT DOCUMENTS

| | | | | |
|---|---|---|---|---|
| 4,170,148 A | * | 10/1979 | Wolfe | 74/337.5 |
| 4,197,760 A | * | 4/1980 | Wolfe | 74/473.24 |
| 4,373,403 A | * | 2/1983 | Malott et al. | 74/337.5 |
| 5,421,792 A | * | 6/1995 | Kataumi et al. | 477/99 |
| 5,737,969 A | * | 4/1998 | Brown et al. | 74/473.25 |
| 5,768,945 A | * | 6/1998 | Ose | 74/489 |
| 6,067,872 A | | 5/2000 | Miyahara et al. | |
| 6,182,527 B1 | | 2/2001 | Sander | |
| 6,260,436 B1 | | 7/2001 | Sander et al. | |
| 6,736,020 B2 | * | 5/2004 | Koyama et al. | 74/335 |
| 6,820,515 B2 | * | 11/2004 | Ikeya | 74/473.3 |
| 6,918,314 B2 | | 7/2005 | Wang | |
| 7,114,410 B2 | | 10/2006 | Nagasawa | |

(Continued)

FOREIGN PATENT DOCUMENTS

| | | |
|---|---|---|
| DE | 198 44 275 A1 | 4/2000 |
| DE | 100 59 383 A1 | 6/2002 |

(Continued)

*Primary Examiner* — Justin Krause
*Assistant Examiner* — Gregory Prather
(74) *Attorney, Agent, or Firm* — Davis & Bujold, PLLC; Michael J. Bujold

(57) ABSTRACT

An actuating device for selecting gear steps in a gearshift transmission. The actuating device comprises a selector lever that can be moved between at least two drive-setting positions and a locking mechanism for restricting the movement range of the lever and locking certain positions or for locking the selector lever. The locking mechanism comprises a locking recess connected to the selector lever and a blocking cam that can be rotated by an actuator. The cam engages in the locking recess. Complex locking tasks are possible with the simplified actuating device. In addition, the range of movement of the selector lever can be freely positioned largely variably and its width can be changed. Furthermore, the selector lever of the actuating device is movable by the actuator or locked in a desired position.

18 Claims, 4 Drawing Sheets

(56) References Cited

U.S. PATENT DOCUMENTS

| | | |
|---|---|---|
| 7,231,846 B2 | 6/2007 | Marhefka et al. |
| 7,308,838 B2 | 12/2007 | Inoguchi et al. |
| 7,603,926 B2 | 10/2009 | Kliemannel et al. |
| 7,712,392 B2 * | 5/2010 | Molkow et al. ............ 74/473.21 |
| 7,810,627 B2 * | 10/2010 | Saitoh ........................ 192/219.5 |
| 7,845,248 B2 | 12/2010 | Yoshiyama et al. |
| 7,921,746 B2 | 4/2011 | Giefer et al. |
| 7,980,153 B2 * | 7/2011 | Ehrlich et al. ............... 74/473.1 |
| 8,061,231 B2 | 11/2011 | Fischer et al. |
| 8,359,943 B2 * | 1/2013 | Seki ............................ 74/473.3 |
| 2002/0020236 A1 | 2/2002 | Onodera |
| 2003/0029264 A1 * | 2/2003 | Onuma et al. ............... 74/473.1 |
| 2003/0230158 A1 | 12/2003 | Yamamoto |
| 2004/0226801 A1 | 11/2004 | De Jonge et al. |
| 2005/0081669 A1 * | 4/2005 | Ikeya .......................... 74/473.1 |
| 2006/0005654 A1 * | 1/2006 | Ehrlich et al. ............... 74/473.1 |
| 2006/0081085 A1 | 4/2006 | Otsuka et al. |
| 2007/0089556 A1 * | 4/2007 | Kim ........................... 74/473.3 |
| 2007/0137364 A1 | 6/2007 | Howe et al. |
| 2007/0234837 A1 | 10/2007 | Russell |
| 2008/0028886 A1 | 2/2008 | Molkow et al. |
| 2009/0217782 A1 | 9/2009 | Wang |

FOREIGN PATENT DOCUMENTS

| | | |
|---|---|---|
| DE | 10 2005 023 926 A1 | 11/2006 |
| EP | 0 974 776 A2 | 1/2000 |
| WO | 2007/009415 A1 | 1/2007 |

* cited by examiner

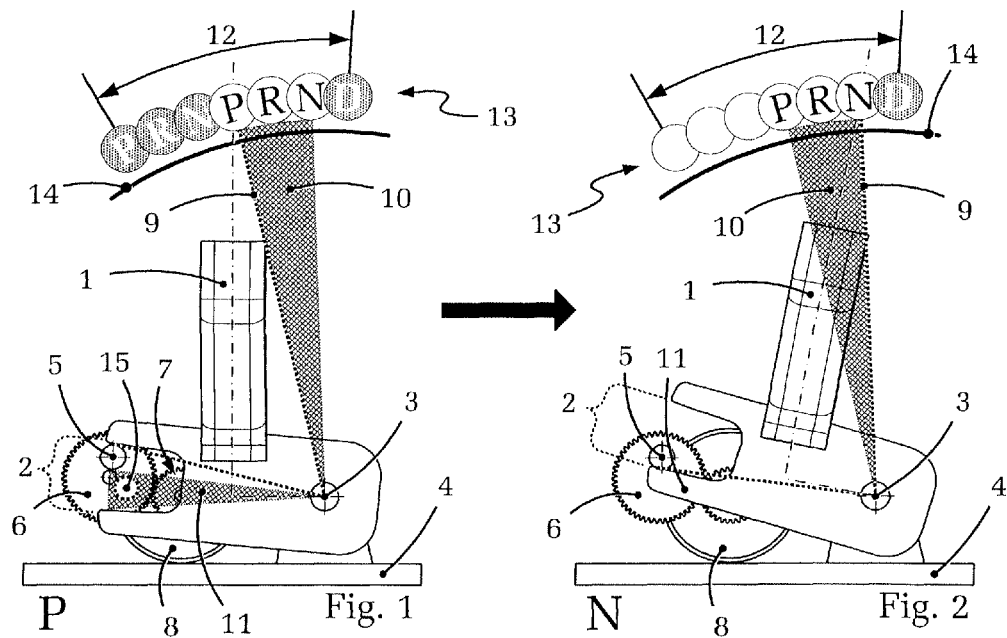
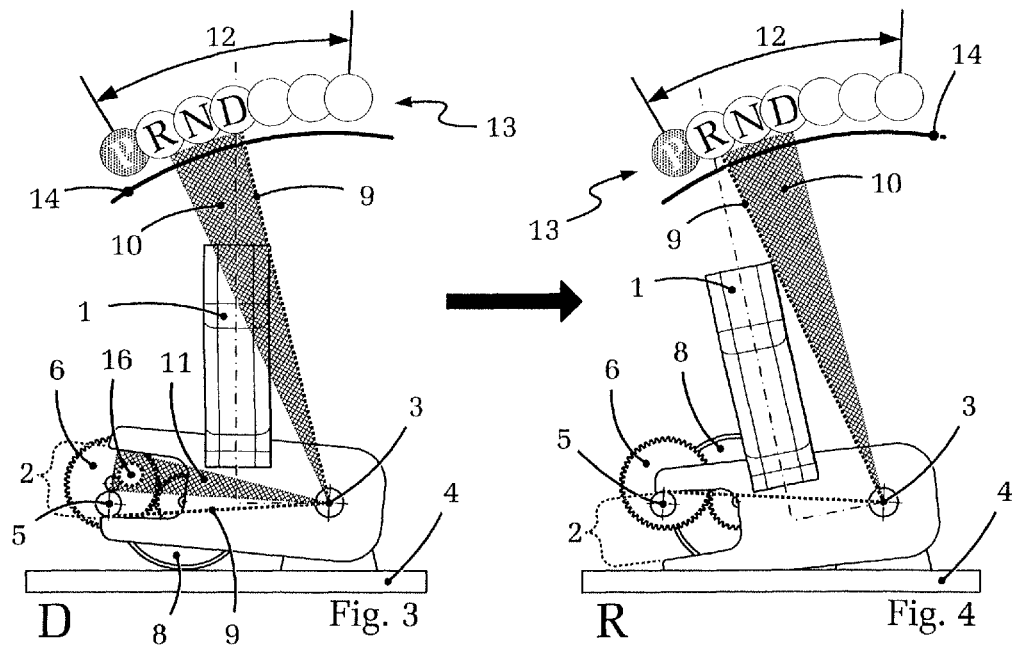

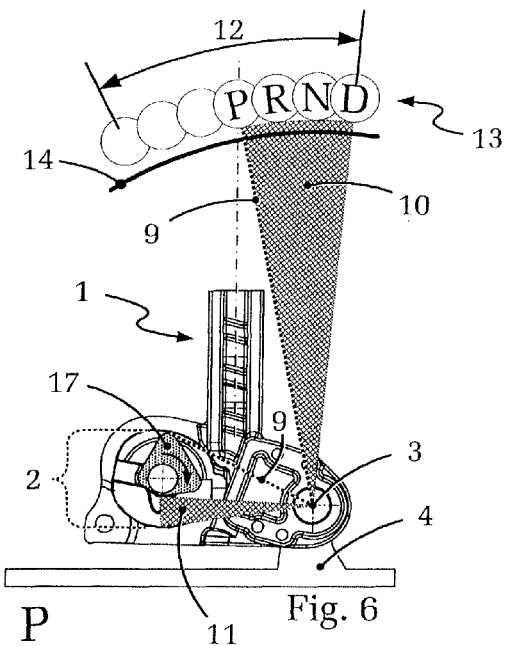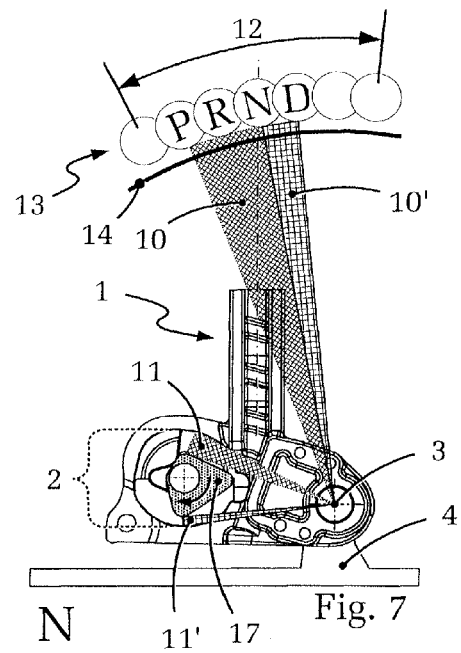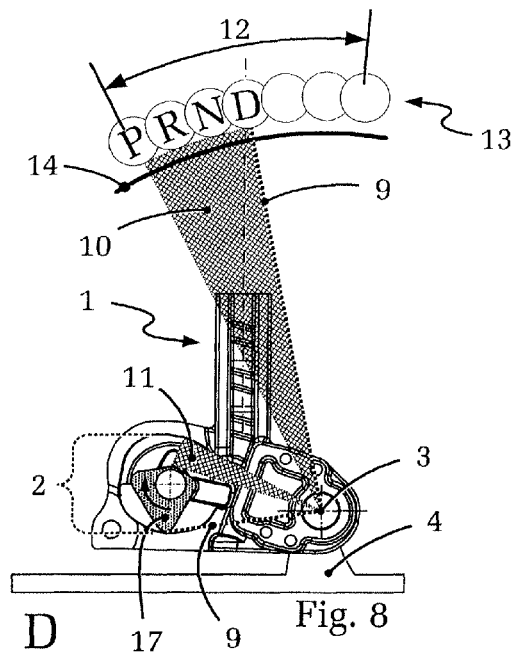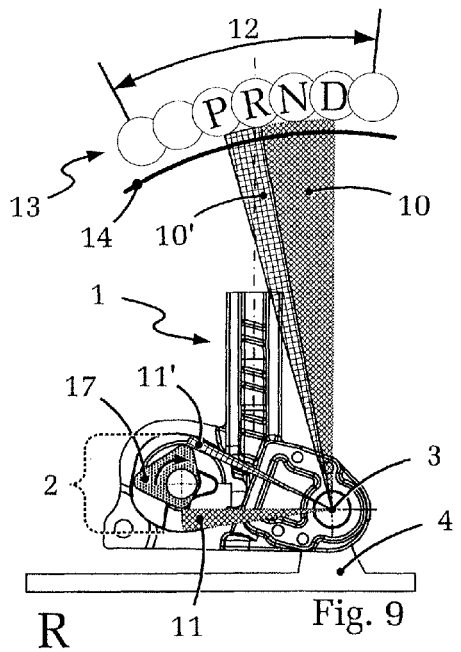

ACTUATING DEVICE COMPRISING A LOCKING MECHANISM

This application is a divisional application of U.S. patent application Ser. No. 12/599,052 filed Nov. 6, 2009, which is a National Stage completion of PCT/EP2008/050013 filed May 7, 2008, which claims priority from German patent application serial no. 10 2007 024 030.0 filed May 22, 2007.

FIELD OF THE INVENTION

The invention concerns an actuating device for a gearshift transmission, for example an automatic transmission with shift-by-wire actuation.

BACKGROUND OF THE INVENTION

Gearshift transmissions of motor vehicles are usually controlled or shifted by means of an actuating device arranged within reach of the driver. As a rule actuating elements such as shift levers or selector levers are used, which are for example arranged between the front seats of the motor vehicle.

The design and ergonomic requirements for such actuating devices or selector levers for gearshift transmissions are many and various. For example, in order to give the driver a realistic feeling of transmission actuation for reasons of safety and ergonomics, such actuating devices are required to provide the driver with both visual and sensory or tactile feedback about the current shift or operating status of the transmission.

Depending on the status of the gearshift transmission to be operated and depending, too, on other motor vehicle status factors—ignition switched on, engine running, vehicle speed, etc.—it is for example generally necessary, sometimes, to restrict the actuation range of the selector lever so as to prevent the driver from selecting any momentarily inadmissible shift conditions or drive settings of the gearshift transmission.

Particularly in the case of gearshift transmissions controlled by shift-by-wire, including most of the automatic transmissions in use today, for reasons of safety and ergonomics it is necessary for momentarily inadmissible shift conditions to be signaled to the driver both visually and by touch, by appropriately locking the associated operating positions of the selector lever.

In the case of the previously usual, purely mechanical transmission actuation or mechanical coupling between the selector lever and the gearshift transmission—for example by means of a cable or rods—by virtue of this mechanical coupling between the selector lever and the transmission the position of the selector lever always reflected the actual status of the transmission, and any actuation blocks in the transmission could be directly felt at the selector lever as well owing to this mechanical transfer.

However, in the case of the increasingly used electric actuation, or that of shift-by-wire actuation of gearshift transmissions, there is no longer any mechanical coupling between the actuating element or selector lever in the passenger compartment and the transmission of the motor vehicle in the engine compartment. Rather, in the case of "shift-by-wire" transmissions shift commands are usually transmitted from the actuating device to the motor vehicle's transmission exclusively by means of electric or electronic signals, with subsequent, usually electro-hydraulic implementation of the shift commands in the transmission itself. This applies in part to modern gearshift transmissions, but in particular to the current generations of automatic transmissions, most of which are actuated completely remotely by actuators.

However, in the case of gearshift transmissions actuated by shift-by-wire the result of this lack of any mechanical link between the transmission actuator system and the selector lever is that any shift locks engaged in the transmission—because of the current status of the vehicle or its transmission—can no longer react via a shift rod upon the condition of the selector lever. Accordingly, no longer can the driver recognize with certainty, by virtue of the blocking of certain shift positions detectable at the selector lever, that the corresponding drive settings or transmission conditions are not permissible and cannot be selected while in the driving condition at that time.

It has been attempted to overcome this problem by providing the selector levers of shift-by-wire controlled gearshift transmissions with various actuators for the selective blocking of inadmissible shift commands. These actuators are activated depending on the status of the vehicle or its transmission, in order to restrict the original overall movement range of the selector lever as appropriately for the momentary driving or transmission status.

However, this is disadvantageous because the structural space that must be provided in the area of the selector for such a plurality of actuators is not always available. Furthermore, such usually electromagnetic actuators, which contain copper windings of not inconsiderable weight, contribute toward an undesired increase of the weight of the shift unit as a whole. Not least, a plurality of separate actuators also increases the assembly effort and hence the costs for the shift unit. And in view of the increased efforts to reduce fuel consumption, even the energy consumption of such actuators and the associated generation of heat play a part that is not negligible.

SUMMARY OF THE INVENTION

Against this background the purposes of the present invention is to provide an actuating device, in particular for the electric or electronic shift-by-wire actuation of a gearshift transmission, which comprises a blocking mechanism and by virtue of which the above-mentioned drawbacks of the prior art can be overcome. In particular, the blocking mechanism should involve as small as possible a number of actuators, even in the case of complex blocking patterns, whereby especially weight, space, energy consumption and costs are reduced, while at the same time ensuring reliable functionality.

In a presumed and initially known manner, the actuating device according to the present invention comprises a selector lever which can be moved within at least one shift gate, and a locking mechanism. The locking mechanism serves to restrict the movement range of the selector lever, to block certain drive-setting positions of the selector lever, or even to lock the selector lever in certain selector lever positions.

According to the invention, the distinguishing feature of the actuating device is that the locking mechanism comprises a locking recess connected to the selector lever and a substantially prismatic locking cam that can be rotated by actuator means about a rotation axis, such that the cam rotation axis extends parallel to the longitudinal axis of the cam and such that the cam engages in the locking recess connected to the selector lever.

This provides a simply designed, robust and operationally secure variable locking mechanism for restricting the movement range of the selector lever and/or for locking the selector lever in certain selector lever positions, which requires only one actuator. In particular, the actuator device can be made as a transmission servomotor, which has the added advantage that regardless of the position of the locking cam and regardless of the status of the either activated or deactivated selector lever lock, no operational energy at all is needed to maintain the locking position.

Besides enabling the selector lever to be locked in certain positions or the movement range of the selector lever to be restricted, the actuating device according to the invention also offers the possibility of varying the position of the entire movement range of the selector lever as a function of the rotation angle position of the locking cam, while leaving its size unchanged.

Moreover, compared with the known locking devices for selector levers there is the advantage that by actuating the selector lever at the same time as the actuation of the locking mechanism, the risk of unintentionally moving the just engaged selector lever lock too far, and thus of the selector lever remaining in a currently locked selector lever position, can be avoided. This is because if a selector lever lock is mistakenly overrun at the moment when the lock is engaged, then due to the engaging lock in the form of the rotating cam the selector lever can simply be moved back to the correct position. In other words, this means that the locking mechanism according to the invention can also even be used as an actuating means for the automatic movement of the selector lever in certain situations.

Especially in view of the variable positioning of the entire movement range of the selector lever, according to a particularly preferred embodiment of the invention the selector lever is of monostable design.

In other words, this means that the so-designed, monostable selector lever always returns again to the same central position after each shift actuation. This can be advantageous above all in the actuation of shift-by-wire controlled transmissions, since in this way there is no need, in particular, for motor-driven restoration of the selector lever when drive settings of the transmission are engaged automatically, for example in the case of the "Auto-P" function which automatically engages the parking lock. Instead, with such selector levers of monostable design it is only necessary to follow or update the transmission drive-setting display in each case and adapt it to the current transmission condition.

For the driver, however, this means that with a selector lever of monostable design the feedback about the actual shift status of the transmission now exclusively requires a separate indication, for example by means of light-emitting diodes or display symbols. In contrast, with a monostable selector lever there is no possibility of providing the driver with feedback about the shift status of the transmission by visual or tactile means, from the position of the selector lever.

Moreover, with monostable selector levers known from the prior art it is complex and expensive to implement the correct mechanical shift logic, to establish mechanically the movement angle range of the selector lever that is permissible in each case, and if needs be to set necessary shift lever locks such as Keylock or Shiftlock, since until now an elaborate actuator system has been needed for the selective locking of the selector lever.

However, the use according to the invention of a locking mechanism with a rotating locking cam has decided advantages in this respect too. This is because the co-operation of the locking cam with the locking recess arranged on the selector lever not only enables a variable restriction of the selector lever's range of movement to be achieved, if necessary with locking of the selector lever, but in addition the permissible movement range of the selector lever can be positioned variably within the movement window of the selector lever as a whole.

The latter feature is important with a monostable selector lever inasmuch as the central position to which the selector lever automatically always returns after actuation can be assigned to any desired actual shift condition of the transmission. In particular, the stable central position to which the selector lever returns can correspond to any of the standard drive-setting positions "P", "R", "N", or "D". Which of the drive settings the transmission is in at the time, is primarily indicated only by correspondingly variable display means on the selector lever or on the instrument panel of the vehicle.

Thanks to the use of a locking mechanism with a locking cam according to the invention, however, even with a monostable selector lever the behavior of a normal, multistable selector lever with several stable selector lever positions can be reproduced inasmuch as the actual mobility of the selector lever depends on the drive setting actually engaged in the transmission, and this indeed, without the need for selective locks on the selector lever for that purpose. For example, if the parking lock is engaged in the transmission a conventional selector lever cannot be moved to any further forward steps but in general by up to three steps backward before it encounters the end-stop of the actuating device opposite the parking lock position or at the opposite end of the selector lever's gate.

Thanks to the invention, however, this behavior that corresponds to intuitive operability can also be reproduced in the case of a monostable selector lever, since by appropriate actuation of the locking cam the currently permitted movement range of the selector lever can in each case be displaced within the overall movement window of the selector lever in such manner that corresponding movements of the selector lever are only possible in such a direction and only through such an angle as to correspond logically with the transmission drive setting engaged.

The invention can be implemented largely regardless of how the cam is shaped or designed and how the actuation of the cam is configured. However, in particularly preferred embodiments of the invention the cam is arranged on the face of a cam wheel, this cam wheel preferably being a gearwheel.

In this way the mounting of the cam can be of simple design and the eccentricity of the cam relative to its rotation axis can be varied simply, for example to adapt the design of the locking mechanism to different selector lever kinematics. The formation of the cam as one of the gearwheels of the locking mechanism's actuation system advantageously combines the functions of parts of the locking mechanism's actuator gearing with the cam wheel, enabling the locking mechanism to be made particularly simple, inexpensive and robust.

In another preferred embodiment of the invention, the locking recess is arranged on or in an arm connected at an angle to the selector lever. Thanks to this design a space-saving, flat arrangement of the locking mechanism is obtained, for example in the area of a base of a selector lever mechanism.

According to a preferred embodiment of the invention, the cam has a substantially round cross-section shape. This design can be produced inexpensively and yet, with appropriately eccentric arrangements of the cam on the cam wheel, gives several locked positions for the selector lever, and if necessary also allows variable positioning of the selector lever's movement range within the overall movement window available.

In a further, preferred, alternative embodiment of the invention the cam has an essentially polygonal cross-section shape. By virtue of this design, one and the same locking mechanism can produce several different locking positions or various movement ranges, if necessary of different widths, for the selector lever. Depending on the eccentricity or rotation angle position of the cam, a different currently effective diameter of the cam can act within the locking recess connected to the selector lever. This produces respectively different residual movement paths of the locking recess and hence also of the selector lever relative to the cam, which can result in a defined restriction of the movement range or even complete locking of the selector lever in a particular selector lever position.

According to another embodiment of the invention, the cam has an essentially irregular octagonal cross-section shape. A cam of such design can produce up to four cam diameters of effectively different size and thus up to four movement ranges of different width for the selector lever. Furthermore, owing to the irregular cross-section shape of the cam, the different cam diameters can also be positioned largely independently of one another relative to the rotation axis of the cam, whereby selector lever movement ranges can be positioned in up to eight different locations within the selector lever's movement window as a whole.

However, the invention is by no means limited to polygonal cams with a definite number of edges or a definite number of cam diameters that can be positioned differently. Rather, in principle locking cams with, in principle, any desired number of edges and/or any desired number of effective cam diameters are conceivable and can be made. Likewise included in the invention are locking cams even without edges, which in essence have continuously variable effective cam radii and/or associated locking recesses whose surface, in cross-section, form in essence a curve of arbitrary shape. This makes it possible, by design, to fulfill even very complex requirements for the positioning or size variation of the movement range of a selector lever, such that in particular continuously variable positioning or size change of the movement range can be realized.

Against this background, in a particularly preferred further embodiment of the invention at least one of the effective cam diameters matches the associated effective width of the locking recess relative to the cam in its corresponding rotation angle position. In this way a complete locking position of the selector lever can be produced simply and in particular without additional locking components. To lock the selector lever it is only necessary to move the cam to the angular position in which its effective diameter matches and spans across the effective width of the blocking recess.

In a further embodiment of the invention, the locking mechanism comprises a plurality of cams made as cam plates, arranged axis-parallel with, and in the axial direction adjacent to one another. Thanks to this plurality of cam plates arranged next to one another further, additional shift or locking functions for the selector lever can be realized, such as different shift ranges or blocking ranges that act in different shift gates of the selector lever.

Against this background, in another preferred embodiment of the invention a second cam plate has a locking projection. This locking projection has a shape complementary to that of a cutout in the locking recess, such that the cutout in the locking recess is positioned outside the abutment range for the first cam plate.

In this way, one and the same locking mechanism can additionally also enable locking or release of the lateral mobility of the selector lever, in particular for shifting the selector lever between different selector lever gates, for example between an automatic shift gate and a manual shift gate. For example, to enable the selector lever to be moved from the automatic shift gate to the manual shift gate, it is only necessary to turn the cam, or the cam wheel with the cam plate, to the position in which the locking projection of the second cam plate is aligned with the cutout in the locking recess. The selector lever can now be moved together with the locking recess sideways out of the automatic-shift gate and into the manual-shift gate, since the blocking projection of the second cam plate can pass laterally through the cutout in the locking recess. On the other hand, in all other rotation angle positions of the cam plate, this lateral movement of the selector lever from the automatic-shift gate into the manual-shift gate is locked by the locking projection on the second cam plate.

BRIEF DESCRIPTION OF THE DRAWINGS

Below, the invention is explained in greater detail with reference to drawings which illustrate embodiments representing only examples, and which show:

FIG. 1: Schematic side-view of an embodiment of an actuating device according to the present invention, with a cylindrical cam and with the selector lever in the parking lock position FIG. 2: Representation and view corresponding to FIG. 1, showing the actuating device of FIG. 1 with the selector lever and locking recess moved from drive setting "P" to setting "N"

FIG. 3: Representation corresponding to FIGS. 1 and 2, showing the actuating device of FIGS. 1 and 2 with the selector lever in drive setting position "D"

FIG. 4: Representation corresponding to FIGS. 1 to 3, showing the actuating device of FIGS. 1 to 3 with the selector lever and locking recess moved from "D" to "R"

FIG. 6: Representation corresponding to FIG. 5, showing the actuating device of FIG. 5 with the selector lever in the parking lock position "P" and a movement range on one side in the direction toward the drive-stage position "D"

FIG. 7: Representation corresponding to FIGS. 5 and 6, showing the actuating device of FIGS. 5 and 6 with the selector lever in the neutral position "N" and a movement range on both sides, between positions "P" and "D"

FIG. 8: Representation corresponding to FIGS. 5 to 7, showing the actuating device of FIGS. 5 to 7 with the selector lever in drive setting "D" and a movement range on one side toward the parking lock position "P"

FIG. 9: Representation corresponding to FIGS. 5 to 8, showing the actuating device of FIGS. 5 to 8 with the selector lever in drive setting position "R" and a movement range on both sides between positions "P" and "D"

DETAILED DESCRIPTION OF THE PREFERRED EMBODIMENTS

Figure 5:
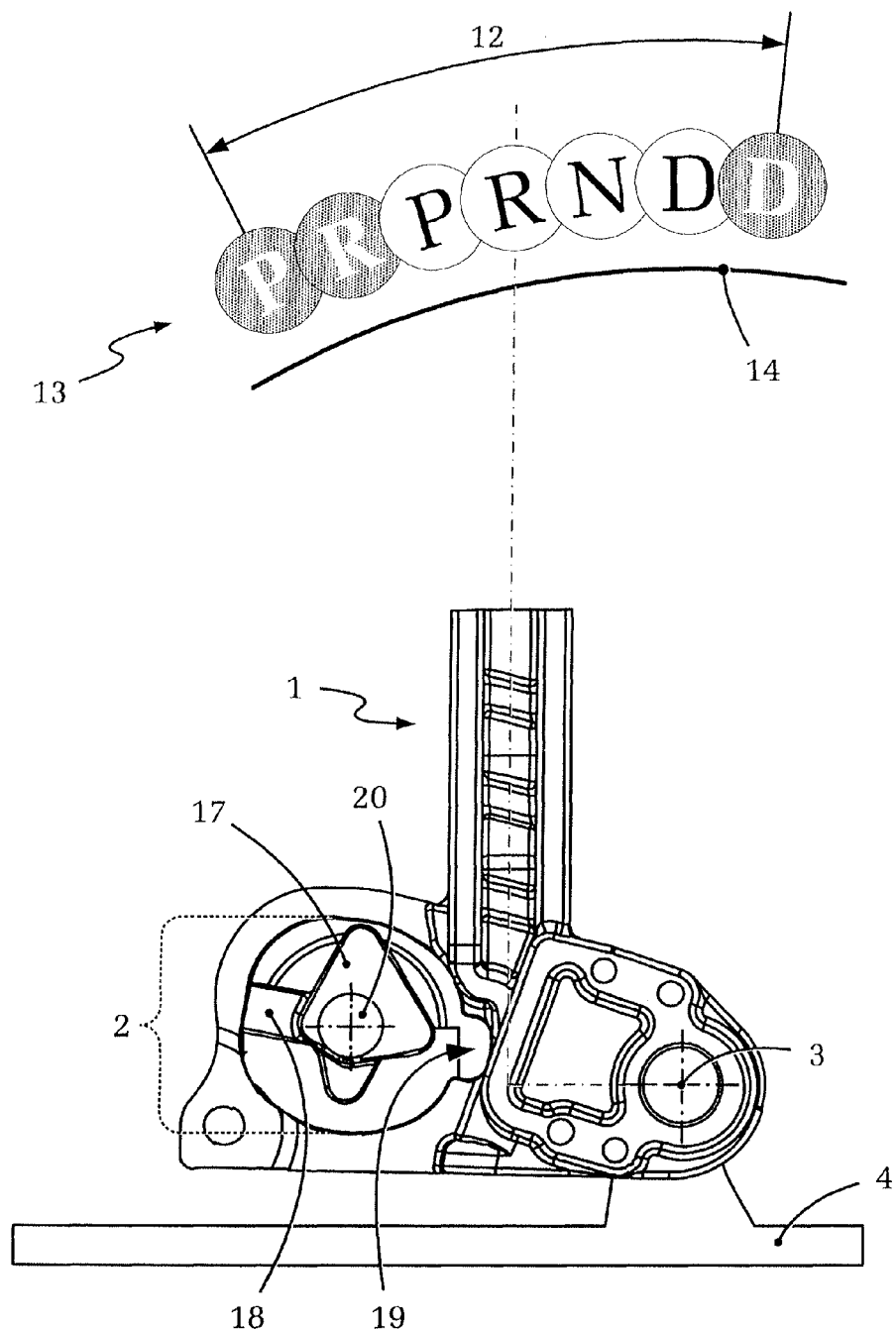
FIG. 5: Representation and view corresponding to FIGS. 1 to 4, showing another embodiment of an actuating device according to the invention with a cam of polygonal shape
Figure 11:
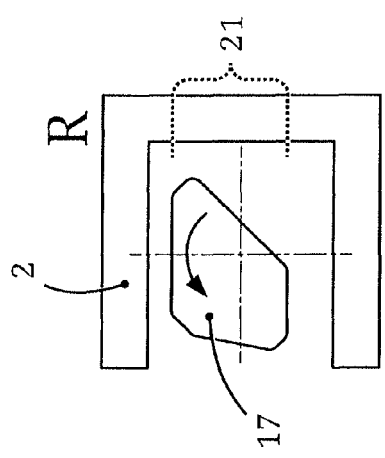
FIG. 11: Representation corresponding to FIG. 10, showing the blocking cam and locking recess of FIG. 10 with the locking cam in drive setting position "R"

FIG. 1 is a schematic lateral view of an embodiment of an actuating device according to the present invention. The figure shows, first, the only partially represented selector lever 1 and the locking recess 2 connected to the selector lever 1. The selector lever 1 and the locking recess 2 are connected to one another and, by virtue of the pivot bearing 3, can pivot relative to the base 4 of the actuating device. The embodiment shown is an actuating device with a monostable selector lever 1. This means that when deflected around its neutral, central position shown in FIG. 1, the selector lever 1 always returns again to that central position under the action of springs.

The figure also shows a cylindrical locking cam 5 arranged on a cam wheel 6 at the same time formed as a gearwheel. The cam wheel 6 is driven via a pinion 7 by an electric motor actuator drive 8. In this way the locking cam 5, which is positioned eccentrically on the cam wheel 6, can be moved to various positions relative to the locking recess 2. In FIG. 1 the locking cam 5 is in its highest position. This position of the locking cam 5 corresponds to the engagement of the parking lock in the vehicle's transmission. In other words, this means that whenever the parking lock has been engaged in the vehicle's transmission, whether manually or automatically, the locking cam 5 is moved by the actuator drive 8 to its highest position shown in FIG. 1.

From the standpoint of the operator or driver this means that when the parking lock is engaged, the selector lever cannot be moved any farther forward, this being symbolized by the bold-dotted line indexed 9. On the other hand, in the embodiment illustrated the selector lever 1 can be moved from the parking lock position through up to two drive setting positions backward (i.e. to the right in the figure), for example so as to select the reversing gear "R" or the neutral position "N". In FIG. 1 this possible movement of the selector lever 1 is symbolized by the movement angle 10 highlighted by cross-hatching, which corresponds with the angularly equal-sized degree of freedom of movement 11 of the locking cam 5. In other words, this means that the relative position of the locking cam 5 within the locking recess 2 variably determines both the momentary end limit 9 of the selector lever 1 and the momentary movement range 10 of the selector lever 1 within the overall selector lever movement window 12 available.

Apart from by the active positioning of the end-stop 9 and the movement range 10 for the selector lever 1, the current shift status of the gearshift transmission to be controlled is signaled to the user by correspondingly variable light indicators 13. The currently engaged drive-setting position is signaled in each case by the light indicators 13 (i.e. parking lock "P" in FIG. 1 or drive setting "D" in FIG. 3), and the respective adjacent gear steps that can be selected are not in spatially fixed association with a particular position relative to the shift gate 14, but rather, a corresponding variable control and display of the drive-setting position engaged at the time and the adjacent gear steps relative to the selector lever 1 in its central position takes place. In other words, this means that—in contrast to conventional selector levers with stable selector lever positions—it is not the selector lever moving relative to a fixed scale which visualizes the gear engaged, but conversely, that this task is taken over by the variably controllable, so to speak virtually movable scale 13 relative to the fixed selector lever 1. In FIG. 1 this is shown by the fact that the dotted, momentarily inactive portions of the gear display 13 are also occupied with one of the possible gear-step indicators.

FIG. 2 shows the situation when the selector lever 1 is moved from the parking lock position of FIG. 1 to the neutral position. Again the locking cam 5 in collaboration with the locking recess 2 ensures that there is a perceptible stop limit 9, this time of the actuation of the selector lever 1. When the selector lever 1 has been released from its position in FIG. 2, it returns again to the central position as in FIG. 1. During this, however, the gear indicator 13 is at the same time changed by the control electronics of the actuating device so that when the selector lever has returned to its central position as in FIG. 1, the now engaged drive setting "N" is still correctly displayed.

At the same time, the actuator device 8 also moves the locking cam 5 to its relative position that corresponds to the selector lever position "N". The latter is indicated by the position 15 of the locking cam 5 shown by the dotted line in FIG. 1 which therefore—in accordance with the now engaged gear stage "N"—allows a relative movement of the selector lever by one step to the right as represented in the drawing or by two steps to the left in the drawing.

A situation analogous to FIGS. 1 and 2 is shown in the representations in FIGS. 3 and 4, with the difference that in FIGS. 3 and 4 the shift takes place, not as before from "P" to "N", but this time from drive setting "D" to the reversing gear "R". Again—in FIG. 3—the relative position of the locking cam 5 within the locking recess 2 initially determines the movement range 10 of the selector lever 1 in the direction of the drive setting "R" available by virtue of the currently engaged drive setting "D" (in accordance with the movement range 11 of the locking recess 2 relative to the locking cam 5), as also the currently imposed end-stop position 9 of the selector lever 1 in the opposite direction toward "D", since the gear stage "D" which is rearmost in relation to the driving direction (farthest to the right in the drawing) is already engaged.

If, as shown in FIG. 4, the selector lever 1 is then moved from drive setting "D" to "R", then this again first generates the corresponding shift command in the gearshift transmission. When the selector lever is then released, it moves back again to its central position as in FIG. 3 and by virtue of the control electronics of the actuating device the gear indication 13 is again changed to reflect the return movement of the selector lever 1, while at the same time the rotation position of the locking cam 5 is correspondingly adapted so that the locking cam 5 then adopts the position 16 again indicated in FIG. 3 by the dotted line.

FIG. 5 shows a further embodiment of an actuating device according to the invention. The actuating device shown in FIG. 5 differs from the actuating device in FIGS. 1 to 4, in particular in that the actuating device of FIG. 5 has an eccentrically rotating, polygonal locking cam 17 of irregular shape. FIG. 5 also again shows a pivot bearing 3 about which the selector lever 1, together with the locking recess 2 connected thereto, can be pivoted relative to a base 4 and relative to the locking cam 17. The actuating device in FIG. 5 also again has a gear indicator 13 with light indicators for the individual drive settings "P", "R", "N" and "D" which can be positioned and controlled variably within the movement window 12 of the selector lever 1 as a whole.

A special feature of the actuating device shown in FIG. 5 is, further, that in this embodiment there are a plurality of cams or cam plates arranged one behind another in the axial direction (i.e. perpendicularly to the plane of the paper). Besides the locking cam 17 there is in particular another cam plate, which in relation to the drawing is arranged behind the locking cam 17. This other cam plate has, in particular, a locking projection 18 such that the locking projection 18, together with the cutout 19, forms an additional locking means for the selector lever. The cutout 19 is arranged outside the contact surfaces or abutment area for the locking cam 17 at the top and bottom in the locking recess 2 relative to the drawing, so that within the locking recess 2 no interference can take place between the various locking functions of the locking cam 17 and the cam plate 18.

In this way, with one and the same locking mechanism and with only one electric-motor actuator, in addition to influencing the movement range of the selector lever 1 it is also possible to lock or release, in particular, any lateral (relative to the vehicle) mobility of the selector lever that may be attempted. Thus, the additional locking function can be used in particular for locking or allowing the lateral shifting of the selector lever between different selector lever gates, for example between the automatic-shift gate and a manual-shift gate.

Thus, to enable the selector lever 1 to be moved, for example, from an automatic-shift to a manual-shift gate, it is only necessary for the camshaft 20 on which the further cam plate with the locking projection 18 and the locking cam 17 are both arranged, to be rotated to that position in which the locking projection 18 is aligned with the cutout 19 in the locking recess 2. Then, the selector lever 1 (together with the locking recess 2) can be moved sideways out of the automatic-shift gate into the manual-shift gate. During this movement the locking projection 18 on the second cam plate can pass sideways through the cutout 19 in the locking recess 2. On the other hand, in any other rotation angle position of the locking cam 17 or the camshaft 20, the sideways movement of the selector lever out of the automatic-shift into the manual-shift gate is locked by the locking projection 18 of the second cam plate, since in such cases, relative to the drawing the locking projection 18 encounters the locking recess 2 at the back and therefore locks the movement of the locking recess 2 into the plane of the drawing (or, relative to the vehicle, in the transverse direction).

FIG. 6, which corresponds to the example embodiment shown in FIG. 5, shows the relative position of the locking cam 17 and the locking recess 2, and of the selector lever 1 connected to the locking recess 2, in the case when the parking lock "P" is engaged. The light elements "PRND" of the gear display 13 are in this case activated or positioned by the control electronics of the actuating device—relative to the selector lever 1 still in its central position—variably within the overall movement window 12 available for the selector lever 1, in such manner that the position of the light elements "PRND" relative to the static selector lever corresponds to the parking lock "P" actually engaged in the transmission.

Furthermore, the variable stop device of the selector lever 1, consisting of the locking cam 17 and the locking recess 2, is also controlled so that the shift path 10 actually available for the selector lever 1 is also logically consistent with the parking lock "P" engaged at the time. In other words, this means that—although of monostable design and therefore always reverting to its central position—the selector lever 1, like a conventional, multi-stable selector lever in the parking lock position, cannot be moved farther forward but at the same time it can be moved by up to three shift steps backward, i.e. the selector lever 1 can be moved backward (or to the right in the figure) as far as drive setting "D" but not forward (or to the left in the figure).

In the actuating device illustrated this is the case, regardless of whether, for example, the parking lock was engaged manually or automatically. This is because even if the parking lock has been engaged automatically from one of the drive settings or from the neutral position "N", the control electronics of the actuating device can automatically reset both the light elements "PRND" of the gear indicator 13 and also the locking cam 17 in such manner that at the selector lever 1 the visual signal (gear indicator 13 showing gear stage "P") and the tactile situation (movement range 10 and end-stop 9 corresponding to the parking stage "P") appropriate for and associated with the parking lock position are produced. Despite the automatic engagement of the parking lock, for example when the driver leaves the motor vehicle, when he returns to it and is starting off again the relative position between the gear indicator 13 and the selector lever 1, as also the end-stops of the selector lever, will be consistent with the "parking lock" position.

In this case the movement range 10 available for the selector lever 1 is determined by the free space 11 between the locking cam 17 and the lower edge of the blocking recess 2, which for the sake of easier identification in FIG. 6, is again highlighted in the drawing by appropriate cross-hatching as also is the movement range 10 itself. On the other hand, the corresponding end-stop 9 of the selector lever 1 in the direction opposite to the movement range (i.e. to the left in the drawing, or forward in the motor vehicle itself) is formed by the locking cam 17 in this case in contact with the upper edge of the locking recess 2.

The behavior in the other three drive-setting positions "N", "D" and "R" of the selector lever 1 is analogous to the situation described for the parking lock position "P". The respectively associated positions of the locking cam 17 and of the light elements "PRND" of the gear indicator 13 are shown in FIGS. 7, 8 and 9.

In FIG. 7 the drive setting "N" is engaged in the transmission. Consequently, by virtue of the control electronics of the actuating device, on the one hand the light elements "PRND" of the gear indicator 13 are brought to a position relative to the selector lever 1 or its shift gate 14 that is consistent with the drive setting "N", and on the other hand the locking cam 17 is rotated far enough to produce corresponding distances or movement angles 11 (shown cross-hatched in the drawing) and 11' (shown with square shading) between the locking cam 17 and the locking recess 2. The movement angles 11 and 11' are transferred proportionally to the selector lever 1 because of the—in this case—integral connection between the selector lever 1 and the locking recess 2, and therefore define the movement possibilities 10 (again cross-hatched) and 10' (again square-shaded) available in the drive-setting position "N" engaged at the time.

The situation illustrated in FIG. 9 for drive-setting position "R" is entirely similar to the behavior described with reference to FIG. 7 for drive-setting position "N". Essentially, the only difference between the situations in FIGS. 9 and 7 respectively, is that the locking cam 17 has been rotated through 180° so that, otherwise than in FIG. 7, the movement angles 11 and 11' of the locking recess 2 and the movement angles 10 and 10' of the selector lever 1 have reversed size ratios. In addition, the position of the light elements "PRND" of the gear indicator 13 has been adapted to the currently engaged drive-setting position "R" and displaced within the overall movement window 12 by corresponding actuation of the light elements concerned.

The situation shown in FIG. 8 relating to drive-setting position "D" corresponds in essence to the situation in FIG. 6 when the parking lock is engaged, with the difference that in FIG. 8 the locking cam 17 has again been rotated through 180° relative to the parking lock position in FIG. 6, and in addition the position of the light elements "PRND" of the gear indicator 13 has again been correspondingly adapted within the movement window 12. Owing to the correspondingly changed rotation position of the locking cam 17 within the locking recess 2, the movement angle 10 and 11 of the selector lever 1 obtained, as appropriate for the drive-setting position "D", extends three steps forward, or to the left in the drawing, and at the same time the selector lever 1 is locked in the rearward direction, or to the right in the drawing, as indicated by the dotted line 9.

Thus, in FIG. 8 or in the drive-setting position "D" as well, both the position of the gear indicator "PRND" relative to the selector lever 1 and the actual movement possibilities of the monostable selector lever 1 are consistent with the given circumstances, as they would be in the case of a conventional, multi-stable selector lever with stable selector lever positions.

Finally, FIGS. 10 to 14 show very schematically the locking mechanism of a further embodiment of an actuating device according to the invention. In each case the figures show the again irregular-polygon-shaped locking cam 17, which in its different rotation positions illustrated in FIGS. 10 to 14 produces different respective pairs of movement angles 10 and 10' or 11 and 11' (see FIGS. 7 to 9) for the locking recess 2 and therefore also for the selector lever 1 (not shown here) connected to the locking recess 2.

The special feature of the embodiment shown in FIGS. 10 to 14 is, in particular, that the locking cam 17 can adopt not just four, but rather, five different rotation positions, in which the locking cam 17 has respectively different effective diameters 21 or a different relative position of its effective diameter 21 in each case within the locking recess 2.

Figure 12:
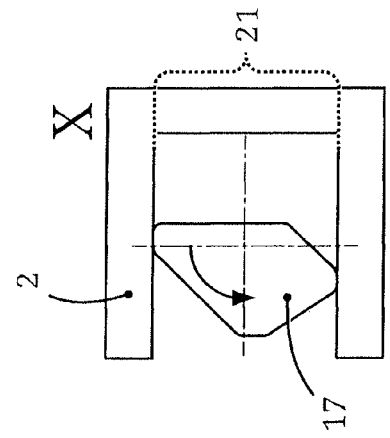
FIG. 12: Representation corresponding to FIGS. 10 and 11, showing the locking cam and blocking recess of FIGS. 10 and 11 with the locking cam in the selector lever locking position
Figure 10:
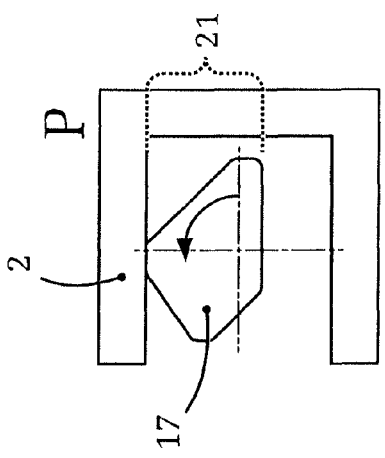
FIG. 10: Schematic side-view showing the locking cam and locking recess of another embodiment of an actuating device according to the invention, with the locking cam in the parking lock position "P"
Figure 14:
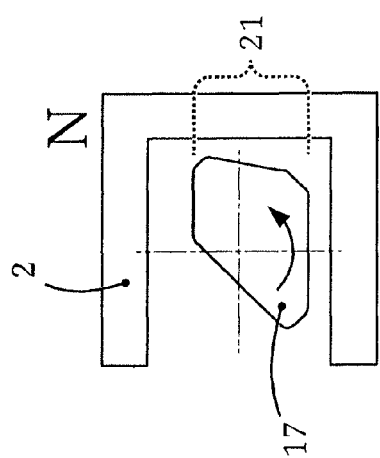
FIG. 14: Representation corresponding to FIGS. 10 to 13, showing the locking cam and locking recess of FIGS. 10 to 13 with the locking cam in the neutral position
Figure 13:
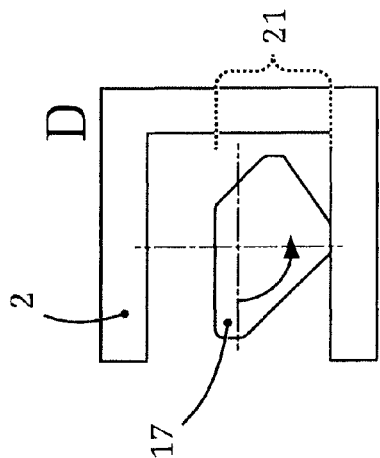
FIG. 13: Representation corresponding to FIGS. 10 to 12, showing the locking cam and locking recess of FIGS. 10 to 12 with the locking cam in the drive setting position "D"

Note in particular FIG. 12, in which the fifth, additional rotation angle position of the locking cam 17 is shown. In this fifth rotation angle position shown in FIG. 12, the effective Diameter D of the locking cam 17 exactly fits the full width of the locking recess 2.

In other words, this means that the locking mechanism of FIGS. 10 to 14 not only provides four different pairs of movement angles 10 and 10' or 11 and 11' respectively (see FIGS. 7 and 9) for the purpose of correct tactile control of the selector lever 1, but in addition a fifth rotation angle position of the locking cam 17, that shown in FIG. 12, which can be used to lock the selector lever completely in a particular position, for example to indicate to the driver by touch that the vehicle or the transmission is not ready to operate, or that a safety lock is still engaged.

As a result it becomes clear that the invention provides an actuating device with a locking mechanism which, compared with the prior art, has the particular advantage that even in the case of complex locking tasks it requires the minimum possible number of actuators. Additional advantages are achieved by virtue of its very simple design and thus inexpensive construction, and its energy-saving operating possibilities. Moreover, the locking mechanism of the actuating device according to the invention also allows freely variable positioning or change of the movement range of a selector lever, and if necessary too, of the actuated movement of the selector lever.

In this way the invention also enables, precisely for the monostable actuating devices currently in use, a tactile feedback that is always reliable for the driver about the actual shift status and current actuation options for example of an automatic transmission.

Thanks to the inexpensive way in which it can be produced and to its high operational reliability, the invention makes a decisive contribution toward improving comfort, ergonomics and safety in the case of actuating devices for motor vehicle transmissions, in particular in the context of demanding applications in the context of automatic transmissions.

LIST OF INDEXES

1 Selector lever
2 Locking recess
3 Pivot axis
4 Base
5 Locking cam
6 Cam wheel
7 Drive output pinion
8 Servomotor
9 End-stop
10, 10' Angular range
11, 11' Angular range
12 Overall movement angle
13 Drive setting indicator
14 Shift gate
15, 16 Locking cam positions
17 Locking cam
18 Locking projection
19 Cutout
20 Camshaft
21 Effective cam diameter

The invention claimed is:

1. An actuating device for selecting shift steps of a gearshift transmission, the actuating device comprising:
a selector lever (1) that is movable between two drive-setting positions, and
a locking mechanism for restricting a range of movement of the selector lever (1) and locking certain drive-setting positions and for locking the selector lever (1),
wherein the locking mechanism comprises a locking body that defines a locking recess (2) and is fixedly connected to the selector lever (1) so as to prevent relative movement of the locking recess with respect to the selector lever, a locking cam (5, 17) that is actuated to rotate about a rotational axis parallel to a longitudinal axis of the locking cam (5, 17) such that the locking cam (5, 17) engages the locking body in at least two positions in the locking recess (2) to restrict movement of the selector lever in opposite directions, and the locking cam being rotatable between different rotational locking positions and each of the different rotational locking positions of the locking cam defines a distinct range of movement of the selector lever.

2. The actuating device according to claim 1, wherein the locking cam (5, 17) has a substantially round cross-sectional shape.

3. The actuating device according to claim 2, wherein an effective diameter (21) of the locking cam (17) matches an associated effective diameter of the locking recess (2).

4. The actuating device according to claim 2, wherein the selector lever (1) has a monostable design.

5. The actuating device according to claim 2, wherein the locking cam (5, 17) is arranged on a face of a cam wheel (6).

6. The actuating device according to claim 5, wherein the cam wheel (6) is a gear wheel.

7. The actuating device according to claim 2, wherein the locking recess (2) is arranged in an arm connected at an angle to the selector lever (1).

8. The actuating device according to claim 2, wherein the locking mechanism comprises a plurality of locking cams (17) formed as cam plates which are arranged axis-parallel and adjacent to one another in the axial direction.

9. The actuating device according to claim 8, wherein a second cam plate has a locking projection (18) which has a complementary shape to a cutout (19) formed in the locking recess (2) outside a contact area of a first cam plate.

10. The actuating device according to claim 1, wherein the locking cam (5, 17) has a substantially irregular octagonal cross-sectional shape locking cam (5, 17).

11. The actuating device according to claim 10, wherein an effective diameter (21) of the locking cam (17) matches an associated effective diameter of the locking recess (2).

12. The actuating device according to claim 10, wherein the selector lever (1) has a monostable design.

13. The actuating device according to claim 10, wherein the locking cam (5, 17) is arranged on a face of a cam wheel (6).

14. The actuating device according to claim 13, wherein the cam wheel (6) is a gear wheel.

15. The actuating device according to claim 10, wherein the locking recess (2) is arranged in an arm connected at an angle to the selector lever (1).

16. The actuating device according to claim 10, wherein the locking mechanism comprises a plurality of locking cams (17) formed as cam plates which are arranged axis-parallel and adjacent to one another in the axial direction.

17. The actuating device according to claim 16, wherein a second cam plate has a locking projection (18) which has a complementary shape to a cutout (19) formed in the locking recess (2) outside contact area of a first cam plate.

18. An actuating device for selecting shift steps of a gearshift transmission, the actuating device comprising:

a selector lever (1) that is movable between two drive-setting positions, and a locking mechanism for restricting a range of movement of the selector lever (1) and locking certain drive-setting positions and for locking the selector lever (1), wherein the locking mechanism comprises a locking body that defines a locking recess (2) and is fixedly connected to the selector lever (1) so as to prevent relative movement of the locking recess with respect to the selector lever, a locking cam (5, 17) which has a substantially round cross-sectional shape, locking cam (5, 17) is actuated to rotate about a rotational axis parallel to a longitudinal axis of the locking cam (5, 17) such that the locking cam (5, 17) engages the locking body in at least two positions in the locking recess (2) to restrict movement of the selector lever in opposite directions, and the locking cam being rotatable between different rotational locking positions and each of the different rotational locking positions of the locking cam defines a distinct range of movement of the selector lever.

* * * * *